United States Patent [19]

Baumeister et al.

[11] Patent Number: 4,931,883
[45] Date of Patent: Jun. 5, 1990

[54] ZERO GUARD-BAND SKIP-FIELD VIDEO CASSETTE RECORDER

[75] Inventors: Hans-Peter Baumeister, Churchville; William K. Hickok, Brighton; Lawrence J. Bernstein, Honeoye Falls; Matthew DiPietro, Webster; William T. Hochreiter, Rochester, all of N.Y.

[73] Assignee: Eastman Kodak Company

[21] Appl. No.: 908,750

[22] Filed: Sep. 18, 1986

[51] Int. Cl.$^5$ .............................. H04N 5/78
[52] U.S. Cl. ..................... 360/11.1; 360/64; 360/84; 360/10.1; 358/312; 358/313
[58] Field of Search ............... 360/10.1–10.3, 360/11.1, 64, 84; 358/312, 313

[56] References Cited

U.S. PATENT DOCUMENTS

| Re. 29,999 | 5/1979 | Hirota | 360/11.1 |
|---|---|---|---|
| 3,359,365 | 12/1967 | Kihora | 360/11.1 X |
| 3,718,755 | 2/1973 | Crosno | 360/84 |
| 4,040,101 | 8/1977 | Zoellner et al. | 360/64 |
| 4,073,666 | 2/1978 | Lomax et al. | 360/11.1 |
| 4,075,666 | 2/1978 | Lomax et al. | 360/11.1 |
| 4,283,737 | 8/1981 | Nikami | 360/11.1 X |
| 4,426,666 | 1/1984 | Kobayashi et al. | 358/312 X |
| 4,486,792 | 12/1984 | Edakubo et al. | 360/64 X |

FOREIGN PATENT DOCUMENTS

| 44-19333 | 8/1969 | Japan | 360/11.1 |
|---|---|---|---|
| 3271924 | 6/1977 | Japan | 360/11.1 |
| 55-30278 | 4/1980 | Japan | 360/10.3 |
| 1110704 | 4/1968 | United Kingdom | 360/11.1 |
| 1155619 | 6/1969 | United Kingdom | 360/11.1 |

OTHER PUBLICATIONS

Translation of JP44-19333.

Primary Examiner—Aristotelis M. Psitos

[57] ABSTRACT

A skip-field guard-bandless video tape recorder records and plays back adjacent tracks on a video tape with two closely adjacent heads of opposing head gap azimuth angles (to suppress cross-talk), only during alternate (odd) half-rotations of the head drum. Unavoidable cross-talk of synchronization pulses from adjacent tracks does not create visible interference or timing errors during playback by virtue of a special offset angle $\theta_1$, between the adjacent recording heads, proportional to the linear offset distance between adjacent tracks. During playback, skipped fields are "filled-in" by a repetition of each recorded field through a second (duplicate) pair of closely adjacent heads of opposing azimuth positioned to retrace the recorded tracks during the other alternate (even) half-rotations of the head drum. An offset angle $\theta_2$ between the two head pairs (i.e., between opposing heads of like azimuth) corresponds to a half horizontal video line and provides for precise self-interlacing of the repeated fields.

7 Claims, 12 Drawing Sheets

FIG. 11b

ZERO GUARD-BAND SKIP-FIELD VIDEO CASSETTE RECORDER

BACKGROUND OF THE INVENTION

1. Technical Field

The invention is related to video recorders and particularly to video cassette recorders.

2. Description of Related Art

Skip-field video recording and playback is a well-known technique for doubling the record time of a standard video tape cassette. Essentially, a skip-field video cassette recorder (VCR) records an incoming video signal while running the video tape at half-speed and recording only alternate video fields. Such devices are described in U.S. Pat. Nos. 3,524,018; 3,470,315; 3,470,316; 3,359,365, all to Kihara; Re. 29,999 to Hirota; and 3,678,186 to Narita. Generally, the prior art exemplified by these patents teaches various ways of angularly and axially positioning the magnetic heads on the rotary head drum of the video recorder.

U.S. Pat. Nos. 3,359,365 to Kihara and 3,678,186 to Narita teach skip-field recording with four magnetic heads instead of two. The latter Kihara patent teaches that the number of heads is doubled from two to four for purposes of recording the luminance and chrominance components through different heads. The Kihara patent also teaches an angular space between opposing heads related to the linear offset between adjacent recorded tracks on the video tape. The Narita patent requires a guard band between adjacent recorded tracks having a sufficient width so that the two pairs of heads trace recorded tracks and guard bands in alternate sequence to achieve skip-field recording and playback. Neither the Narita nor Kihara patents address zero guard-band recording.

U.S. Pat. No. Re. 29,999 to Hirota teaches a rotary head drum in a video recorder having three heads instead of two and further teaches axially offsetting two of the heads so as to twice reproduce each recorded field during skip-field playback. It also provides for delay of a half horizontal line to achieve the offset required for interlacing repeated fields. However, the Hirota patent does not address zero guard-band recording.

The idea of adding additional magnetic heads to the drum, or of selectively connecting various heads on the drum also has applications to VCR's which can playback while the tape is stopped (U.S. Pat. No. 4,396,954 to Sonoda et al.) and for permitting a selection of different tape speeds (U.S. Pat. No. 4,293,880 to Tsukada et al. and U.S. Pat. No. Re. 31,078 to Segerstrom), but none of these latter patents address the problem of skip-field recording.

Another technique for increasing the play time of a standard video tape cassette is to eliminate the guard band between adjacent recorded tracks on the video tape, in accordance with U.S. Pat. No. 4,293,880 to Tsukada et al. Elimination of the guard band tends to increase cross-talk between adjacent tracks during playback. This problem is solved, however, by differently orienting the gaps of two opposing heads on a video drum, as described in U.S. Pat. No. 4,426,666 to Kobayashi et al.

In summary, two alternate methods are known for increasing the record and playback time of a standard video tape cassette. One is the zero guard-band technique which eliminates the guard band between adjacent recorded tracks. The other is the skip-field recording technique which records only every other field.

Problem

The present invention teaches that even greater performance would be achieved by combining the two techniques of zero guard-band and skip-field video recording. However, there appears to be no teaching in the prior art for realizing such a combination in a practical manner, due to the apparent incompatability of the two techniques. For example, in skip-field recording, the tape length is conserved generally by transporting the video tape at half the standard tape speed. In order to preserve the standard track width and length, the drum rotates at standard speed and only one of two opposing heads records the video signal. Unfortunately, zero guard-band recording requires recording adjacent tracks with different heads having differing head gap azimuth angles, in order to suppress cross-talk between adjacent tracks. Thus, it would not seem possible to combine the two techniques in a practical manner which preserves all of their respective features and advantages.

SUMMARY OF THE INVENTION

Solution to the Problem

A video recorder embodying the invention performs guard-bandless skip-field recording and playback while suppressing cross-talk between adjacent tracks. It includes a rotary drum having four magnetic heads arranged in opposing pairs of adjacent heads. The heads in each pair have different angles of azimuth. Corresponding heads of opposite pairs have the same angle of azimuth, and these heads are positioned on opposite sides of the drum but offset slightly from a true 180° separation by an angle subtended by rotation of the drum during a half horizontal video line. Opposing pairs of heads are offset from one another along the axis of the rotary drum by a distance corresponding to the width of a single recorded track, so that opposing heads of the same azimuthal angle trace the same recorded track on the video tape every drum rotation.

During recording, a first head pair remains inactive while the two heads of the second pair record only those video fields occurring during every other half-rotation of the drum. During playback, the recorded fields are retraced similarly by the heads of one pair during every other half-rotation; but, during the remaining half-rotations, each field is repeated by a corresponding head of the other pair, so as to "fill-in" for the fields which were skipped during recording. This feature has the advantage of eliminating any need for a field store memory. Additionally, the repetition of each field is delayed by a half horizontal line by virtue of the half-line offset angle. This latter feature guarantees precise self-interlacing of the repeated fields without requiring an electronic delay line or the like.

Additional Problem

A significant problem, not encountered in the prior art, concerns the cross-talk from adjacent tracks on the video tape. Cross-talk occurs in guard-bandless video recorders during playback because the width of the magnetic head must be greater than the track width in order to assure that there is no space between adjacent tracks. Cross-talk of the high frequency luminance signal is suppressed by recording adjacent tracks with different heads whose gaps are canted at different angles of azimuth. This technique, however, does not completely suppress cross-talk of horizontal synchronization pulses from adjacent tracks which can introduce timing errors. However, in prior art guard-bandless recorders, this was not a problem because the precise 180° offset angle between the heads caused the horizontal synchronization pulses of adjacent tracks to be spatially aligned in many cases, so that such cross-talk created no significant timing errors.

Unfortunately, in the present invention, none of the heads of opposing azimuth are offset by exactly 180°. Specifically, the heads in each pair must be at least slightly offset from one another, since they cannot physically occupy the same space. This small offset, determined by the size of each head, prevents each head from being separated from the other heads on the drum by precisely 180°, as in the prior art. Therefore, the horizontal synchronization pulses in adjacent tracks are not spatially aligned in the manner of the prior art, potentially giving rise to visible interference in the playback image or timing errors due to cross-talk of horizontal synchronization pulses. It would appear therefore that an impasse is encountered in implementing the invention.

Solution to the Additional Problem

This latter problem is solved in a revolutionary manner by offsetting the two adjacent heads of each pair by an angle $\theta_1$ corresponding precisely to the head drum rotation angle subtended over the linear offset distance between adjacent recorded tracks on the video tape (or odd multiples thereof). The offset angle $\theta_1$ precisely aligns the horizontal synchronization pulses of adjacent tracks while providing the requisite separation between adjacent heads for guard-bandless recording during alternate 180° head drum rotations with alternate opposing azimuth angles, a remarkable result.

DESCRIPTION OF THE DRAWINGS

The invention is best understood by reference to the accompanying drawings of which:

FIGS. 8–11b illustrate various embodiments of multipurpose drum and head assemblies of the invention.

DETAILED DESCRIPTION

Overall Concept

Figures 1, 3:
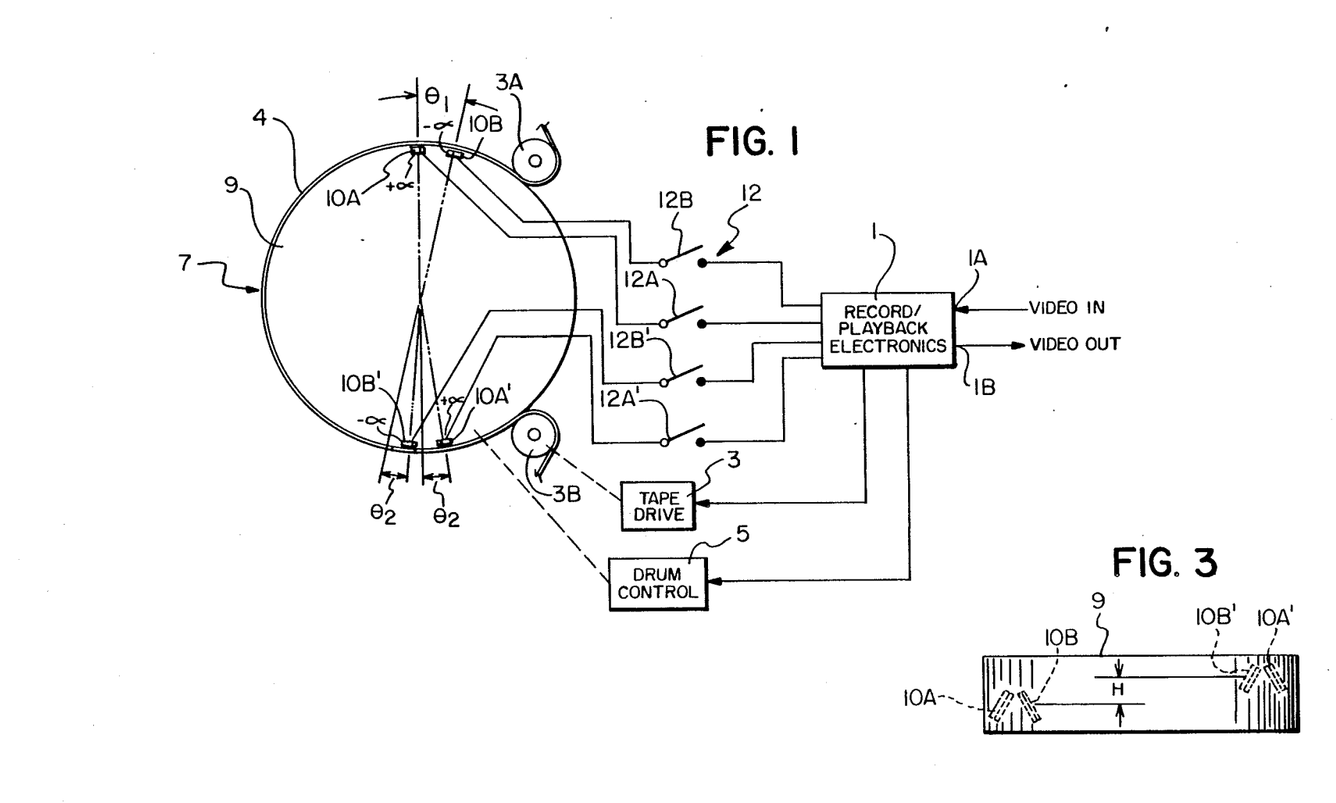
FIG. 1 is a simplified plan view of the rotary head drum of this invention.
FIG. 3 is a side view of the rotary head drum of FIG. 1.

Referring to FIG. 1, a video recorder and playback system such as a video cassette recorder (VCR) adaptable for consumer use includes a record/playback circuit 1 providing control and signal processing. The circuit 1 controls a tape drive controller 3 of the type well-known in the art which, in turn, controls a capstan and roller assembly 3A, 3B for transporting a video tape 4 during record and playback operations. The apparatus further includes a drum controller 5 controlling a four head rotary drum assembly 7. The assembly 7 includes a rotary drum 9 and four magnetic heads 10A, 10B, 10A′, 10B′. The circuit 1 synchronizes the tape drum controller 3 and the drum controller 5 to effect tape motion and drum rotation for helical-scan recording and playback. A head switch 12 includes four switches 12A, 12B, 12A′, 12B′, which connect the heads 10A, 10B, 10A′, 10B′, respectively, to the record/playback circuit 1 in a sequence to be described. During recording, the circuit 1 receives a standard NTSC (or similar format) video signal at its input 1A. During playback, the circuit generates a standard video signal at its output 1B.

Structure of the Four Head Rotary Drum of the Invention

Figure 2:
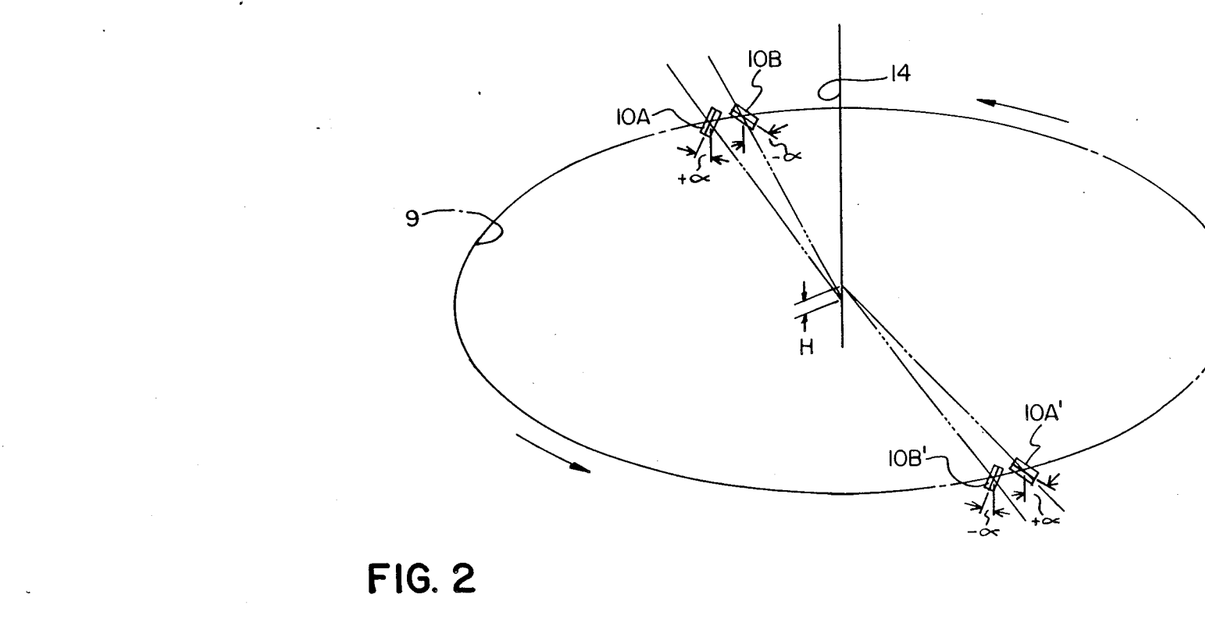
FIG. 2 is a perspective view of the rotary head drum of FIG. 1.

Referring to FIGS. 2 and 3, the four heads 10 are arranged in opposing pairs. The heads 10A, 10B of the "top" pair are spaced apart along the circumference of the drum 9 by an angle $\theta_1$. The gaps of the heads 10A, 10B are canted with respect to each other by azimuth angles $+\alpha$ and $-\alpha$.

The heads 10A′, 10B′ of the "bottom" pair are displaced by nearly 180° from the heads 10A, 10B. The gap azimuth angles of the heads 10A, 10A′ are the same $(+\alpha)$. The gap azimuth angles of the heads 10B, 10B′ are the same $(-\alpha)$. The "$+\alpha$" heads 10A, 10A′ are offset from one another by an angle $180° - \theta_2$. Similarly, the "$-\alpha$" heads 10B, 10B′ are offset from one another by the same angle $180° - \theta_2$.

The drum controller 5 causes the drum assembly 7 to rotate about an axis 14 at an angular frequency $\omega$. Referring to FIGS. 2 and 3, one pair of adjacent heads 10A′, 10B′ is offset from the opposing pair 10A, 10B along the drum axis 14 by a distance H.

FUNCTION OF THE HEADS

Figure 4A:
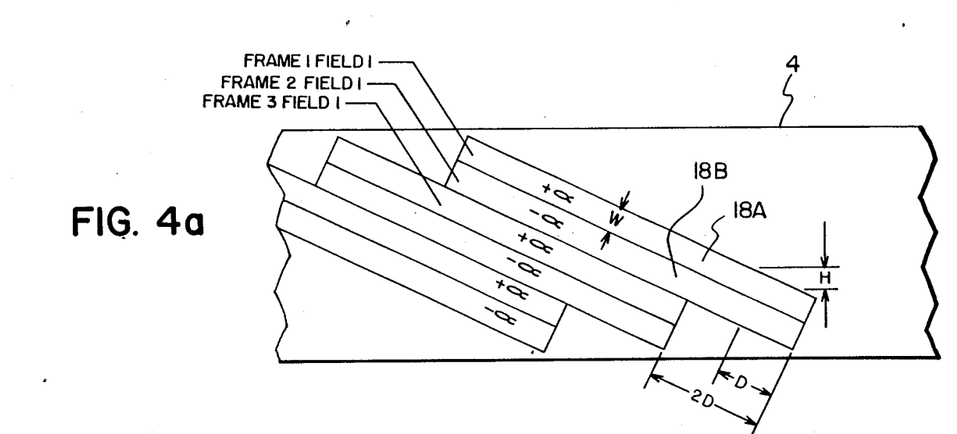
FIGS. 4a and 4b include illustrations of tracks recorded on a video tape by the video recorder of this invention (FIG. 4a) and in the prior art (FIG. 4b)

During skip-field recording, the video tape 4 moves at one-half normal speed while the drum 9 rotates at the usual angular rate $\omega$. This maintains the standard track width because only the odd video fields (for example) of the incoming video signal are recorded. Thus, recording occurs during every other half-rotation of the drum 9. (No recording occurs during the remaining half-rotations so that the even fields are skipped). The head 10A records every other odd field (for example); and the head 10B records the remaining odd fields. Referring to FIG. 4a, alternate odd video fields are recorded on the video tape 4 in individual tracks 18 at alternate azimuth angles $+\alpha$, $-\alpha$.

During skip-field playback, the heads 10A, 10B retrace the respective recorded tracks 18 during alternate half-rotations of the drum 9. During the remaining half-rotations of the drum 9, the other heads 10A′, 10B′ retrace (by virtue of the axial offset distance H) the tracks just traced by the heads 10A, 10B, respectively, to repeat each field played back by the heads 10A, 10B. Accordingly, the heads 10A′, 10B′ "fill-in" for the even video fields (in this example) which were skipped during recording (thus, eliminating the requirement for a field store memory or the like). For this purpose, the axial offset H between the "top" head pair 10A, 10B and the "bottom" head pair 10A′, 10B′ corresponds to the width W of one recorded track 18 (FIG. 4a). Specifically, H=W cos $\theta$, where $\theta$ is the helical scan track angle on the tape.

INTERLACING REPEATED FIELDS: $\theta_2$

The angle $180°-\theta_2$ between opposing heads 10A, 10A' (and between the heads 10B, 10B') is selected so that, during skip field playback, the repetition of each video field is delayed (or advanced) by precisely a half horizontal line. This guarantees accurate self-interlacing of the repeated field with its original to form an interlaced video frame from each recorded video field. Therefore, $\theta_2$ corresponds to the angle of drum rotation (or some odd multiple thereof) subtended during the recording of one-half of a horizontal video line. Significantly, this feature eliminates any need for an electronic delay line to provide a half horizontal line delay for interlacing.

GUARD-BANDLESS CROSS-TALK CANCELLATION: $\theta_1$

Selection of the offset angle $\theta_1$ between adjacent heads (e.g., 10A, 10B; or 10A', 10B') solves a particularly difficult problem in guard-bandless skip-field playback by the novel four head VCR of this invention. In prior art two-head guard-bandless (non-skip-field) systems, differing head azimuth angles suppressed crosstalk between adjacent tracks of the video signal, but did not suppress crosstalk of the higher video frequencies nor of the horizontal synchronization pulses. However, crosstalk of horizontal synchronization pulses was not a problem because the two heads were located precisely 180° apart, so that horizontal synchronization pulses on adjacent tracks were spatially aligned in many cases. This spatial alignment avoided visible interference and significant timing errors arising from cross-talk of synchronization pulses from adjacent tracks. (Crosstalk of the higher video frequencies is prevented using methods well known in the art.)

Achieving the spatial alignment of adjacent tracks in the manner of the prior art would require an offset angle of 180° between opposing heads (e.g., 10A and 10A') and zero degrees between heads within a given pair (e.g. 10A, 10B). However, the two heads in a given pair cannot be physically in the same place, but must be offset by a finite angle from one another. Thus, recorded signals on adjacent tracks cannot be spatially aligned in the manner of the prior art so that synchronization pulses on adjacent tracks may not be spatially aligned. Because the differing azimuth angle technique cannot completely suppress cross-talk of the horizontal synchronization pulses between adjacent tracks, timing errors may arise, a significant problem.

The solution to this problem is to offset the two adjacent heads in each pair (e.g., 10A, 10B) by an angle $\theta_1$ which is an odd integral multiple of the drum rotation angle subtended whenever the head travels through the linear track offset distance D (of FIG. 4b) generally characteristic of prior art guard-bandless recorders. At the head offset angle $\theta_1$, the linear offset distance between adjacent tracks alternates between 2D and zero, as shown in FIG. 4a, while the time difference between alternate adjacent track pairs alternates between zero and an integral multiple of the horizontal line scan period. Thus, horizontal synchronization pulses of adjacent tracks are in spatial alignment.

In VCR's having both standard and long play modes, cross-talk is greater in the long play mode. In this type of VCR, it is preferable to select $\theta_1$ to correspond to the track offset distance D characteristic of the long play mode. In the standard 8 mm VCR format, the track-offset distance D corresponds to exactly a half horizontal line in the long play mode. Therefore, $\theta_1$ preferably is the drum rotation angle subtended during an odd integral multiple of a half horizontal video line.

DETERMINATION OF $\theta_1$, $\theta_2$ and H

Figure 4B:
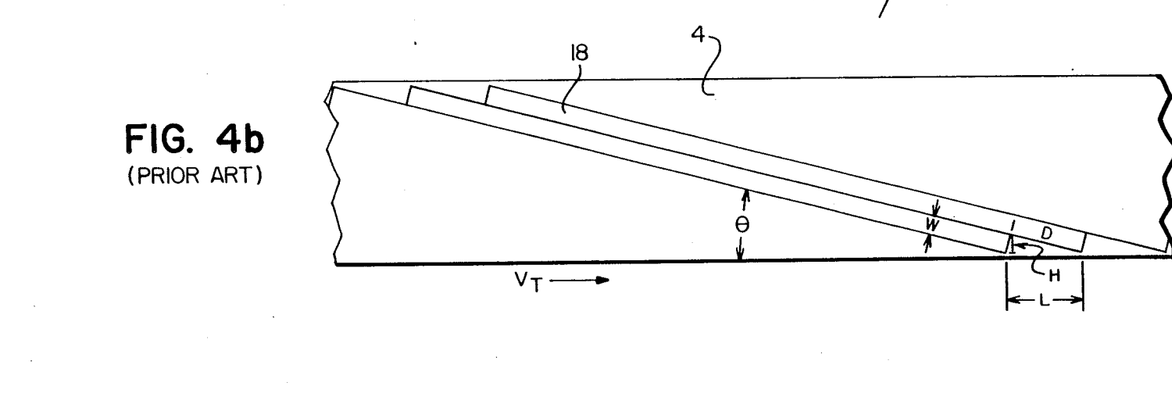

FIG. 4b illustrates the standard format of video tracks recorded on a helically scanned video tape 4. The length L travelled by the tape 4 between the commencement and completion of the scanning of a given track 18 equals the tape velocity $V_t$ multiplied by the period of one video field. The length L and the angle $\theta$ subtended between the track direction and the tape direction defines the width W of each track 18 and the distance D of the linear offset between adjacent tracks as follows: W=L sin $\theta$; D=L cos $\theta$.

The axial displacement H between the opposing pairs of heads is selected so that corresponding heads of the same azimuth of each pair (e.g., 10A, 10A') trace the same track during successive half-rotations of the drum 9. Preferably, H=W cos $\theta$, as mentioned previously herein.

The angle $\theta_1$ is the drum rotation angle subtended during an odd multiple of the number of horizontal lines within the track offset distance D. For example, in the industry standard 8 mm VCR format, a half horizontal line is scanned whenever the heads trace the distance of the linear track offset D in the long play mode. Assuming that (a) one video field is scanned during each half-rotation (180°) by the drum 9, (b) the total number of lines in a field is N, and (c) n is any integer including zero: then $\theta_1$ equals $(180°)((n+\frac{1}{2})/N)$.

$\theta_2$ corresponds to the drum rotation angle subtended during the scanning of a half horizontal video line, to provide the self-interlacing of repeated fields. Thus, $\theta_2$ equals 180° $((\frac{1}{2})/N)$. In the standard 8 mm VCR format, $\theta=4°$ 52' 134", N=262.5 and $V_t$=14.345 mm per sec. However, in skip-field mode, the tape speed $V_t$ is one-half the standard value, namely, 7.173 mm per sec. and $\theta$ is slightly altered accordingly. The selection of n depends upon the optimum angular clearance between adjacent heads. Ideally, n is a small integer such as 0, 1, 2 or 3.

OPERATION OF THE INVENTION

Figure 5:
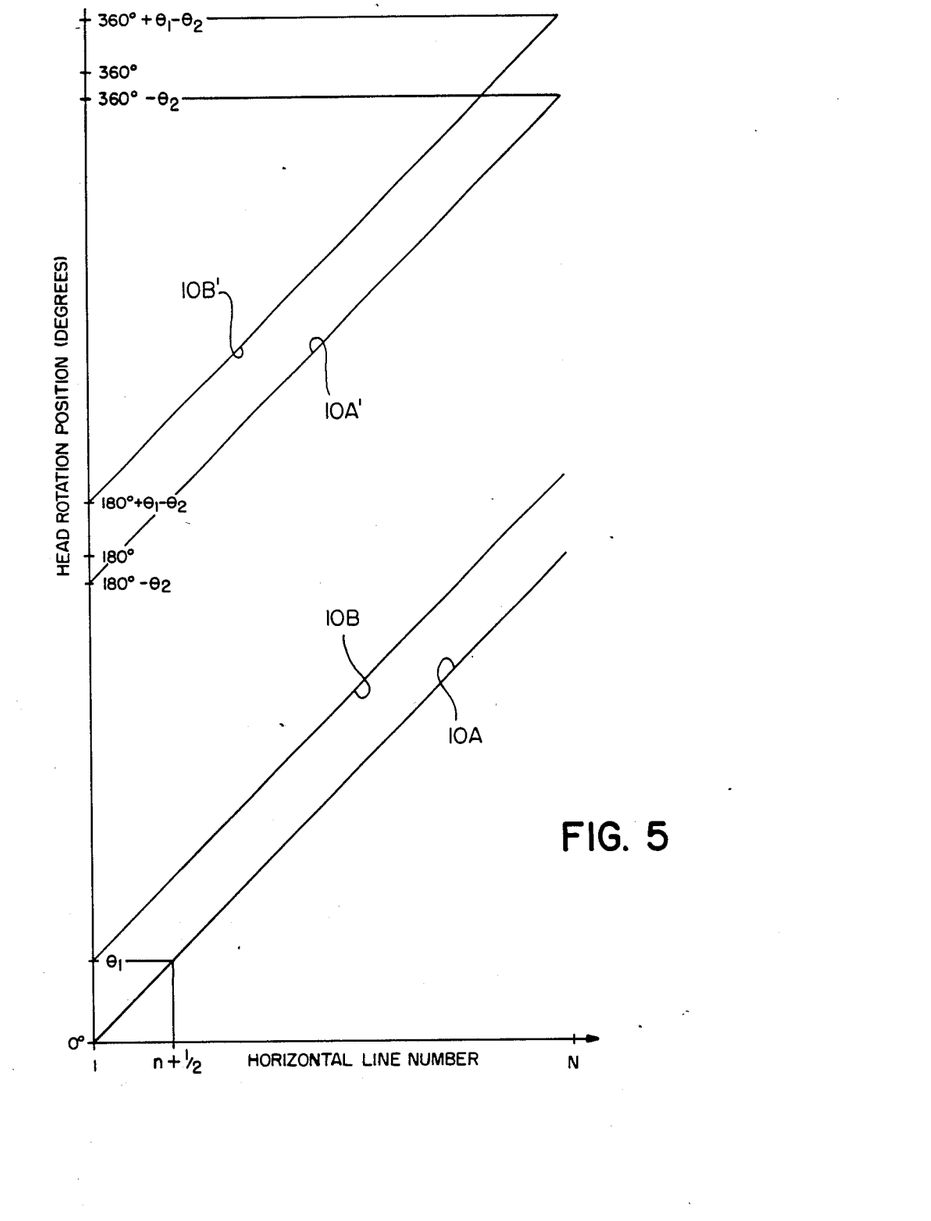
FIG. 5 is a graph of the angular position of each head in the rotary drum of FIG. 1 as a function of horizontal video line number.

FIG. 5 is a graph of the rotational position of the drum 9 of FIG. 1 as a function of the horizontal line number. Mechanically, the first head 10A traces the track 18A as the drum rotates from 0° to 180°. The head 10B starts tracing the track 18A at a drum angle $\theta_1$ and finishes at a drum angle 180°+$\theta_1$. The head 10A' begins tracing the track 18A at a drum angle 180°−$\theta_2$ and finishes at a drum angle 360°−$\theta_2$. The head 10B' begins tracing the track 18A at a drum angle 180°+$\theta_1$−$\theta_2$ and reaches the end of the track 18A at a drum angle 360°+$\theta_1$−$\theta_2$. While the heads 10A, 10B trace the track 18A at about the same time (to within $\theta_1/\omega$), only one of them has an azimuth angle corresponding to the azimuth characteristic of the track 18A. Therefore, the switch 12 connects only one of them to the electronics 1 while track 18A is traced. The same is true of the heads 10A', 10B'.

In skip-field recording, the video tape 4 moves at one-half standard tape velocity. Therefore, during recording, the head drum 9 must rotate by 360°, rather than the usual 180°, between each commencement of recording of adjacent tracks, in order to avoid decreasing the recorded track width from the standard width W. Accordingly, no video signal is applied to any of the heads 10 whenever the drum rotates between 180° and 360°. Thus, only the odd fields, for example, are recorded. Each track 18 is recorded during every other half-rotation of the drum 9, every other track being recorded by the head 10A and remaining tracks being recorded by the head 10B, for example.

The head 10A records the first track 18A during the first half-rotation of the drum 9 to capture, for example, the first odd field of the incoming video signal. Thereafter, no signal is recorded until the drum 9 rotates through a second half-rotation (approximately), before the head 10B begins recording the next track. This half-rotation "idle time" has two effects. First, the even fields of the incoming video signal are skipped. Secondly, the video tape 4 advances by a distance sufficient to insure that the recorded track width is the same as that achieved at normal tape speed characteristic of non-skip-field recording.

The head 10B records the second track 18B during the third half-rotation of the drum 9, thus capturing the second odd field of the video signal. During the fourth half-rotation, "idle time" is in effect so that no recording is made, the second even field of the incoming video signal being skipped.

At this point, the cycle is complete, the heads have returned to their original positions and the cycle is repeated.

RECORDING

The record operation is best understood by reference to the sequential diagrams of FIG. 6. FIG. 6a illustrates the representation used in subsequent figures for the rotational position of the head drum 9. In FIG. 6a, the video tape 4 moves from left to right while the head drum 9 rotates counter-clockwise. An imaginary starting position 25 (defined by an imaginary X pointer 30 and Y pointer 35) is the stationary starting point where each of the heads 10 begins tracing its respective tracks 18 on the tape 4. (For the sake of simplicity, this discussion ignores the alternation of the linear track offset distance between 0 and 2D illustrated in FIG. 4a.) The starting point 25 is stationary with respect to the axis of the drum 9 and with respect to the tape transport mechanism.

Figure 6A:
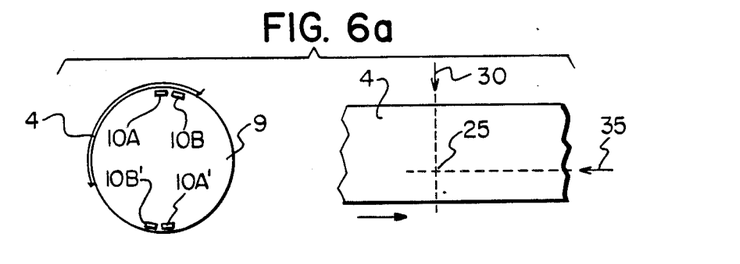
FIGS. 6a–6g include sequential diagrams illustrating the record operation of this invention.
Figure 6B:
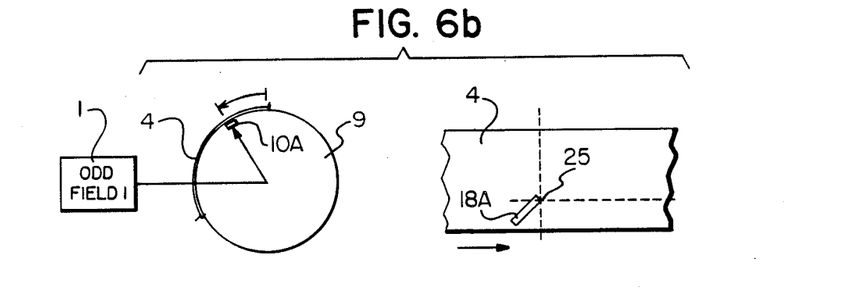

Initially, the record/playback circuit 1 transmits odd video field number 1 through the head switch 12A of FIG. 1 while all other head switches are open. In FIG. 6b, the head 10A begins tracing the track 18A. Rotation of the head 10A past the starting point 25 is synchronous with the beginning of odd video field number 1.

Figure 6C:
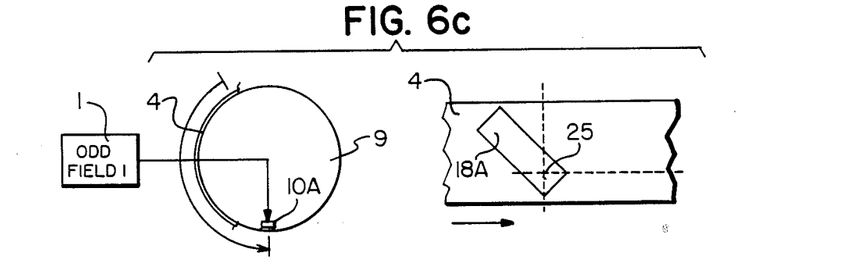
Figure 6D:
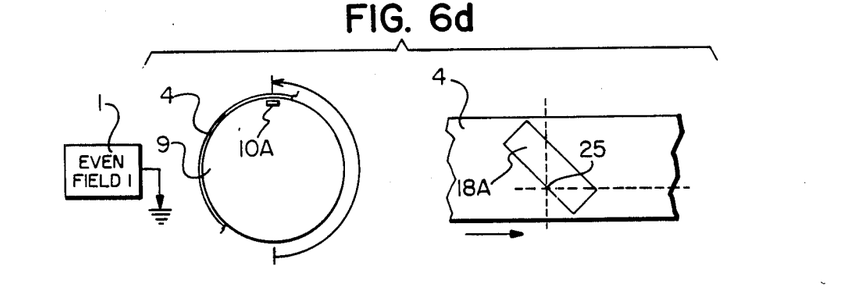
Figure 6E:
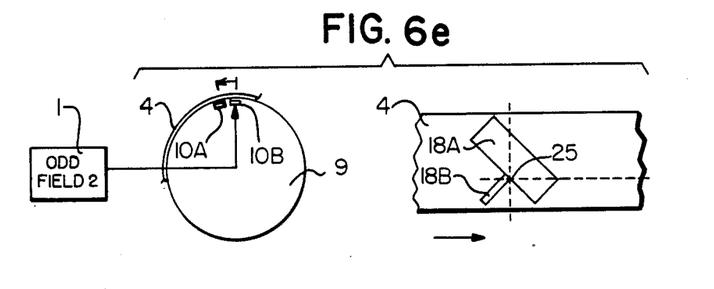
Figure 6F:
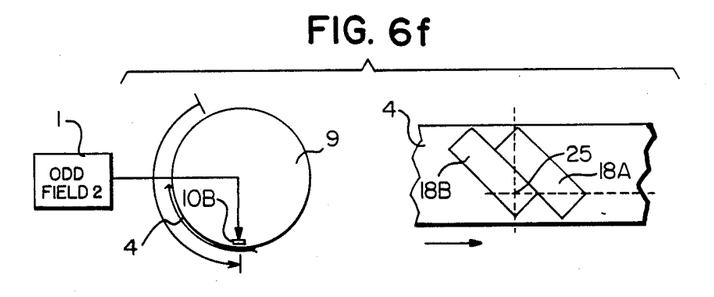
Figure 6G:
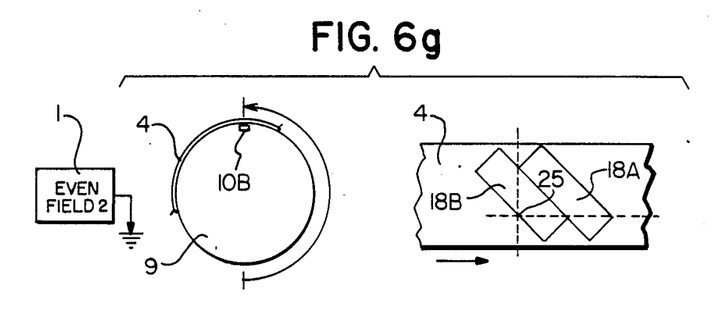
Figure 7A:
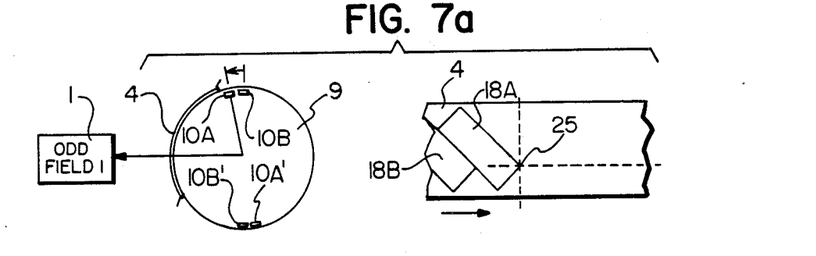
FIGS. 7a–7h includes sequential diagrams illustrating the playback operation of this invention.
Figure 7B:
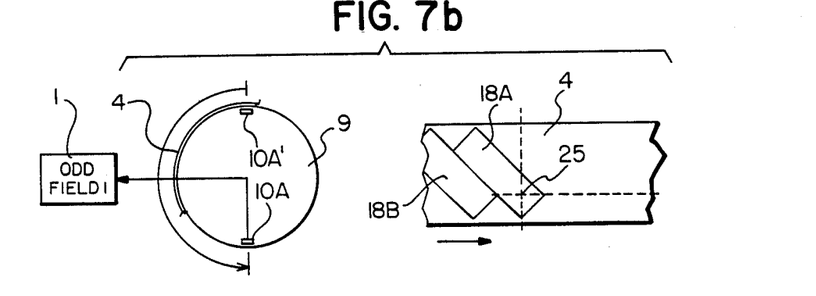
Figure 7C:
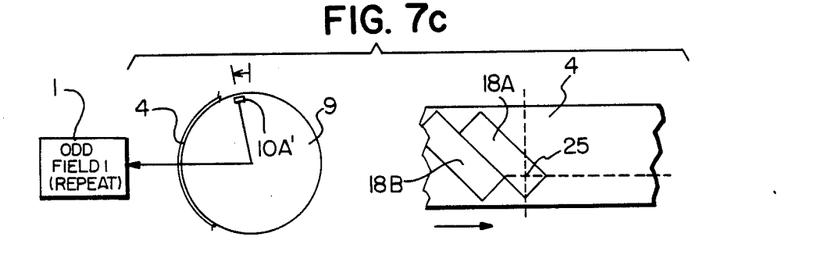
Figure 7D:
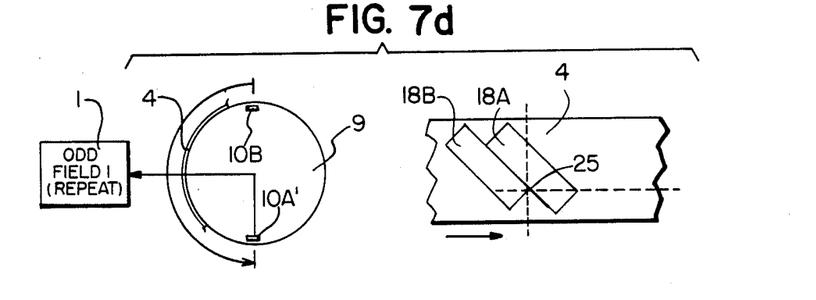
Figure 7E:
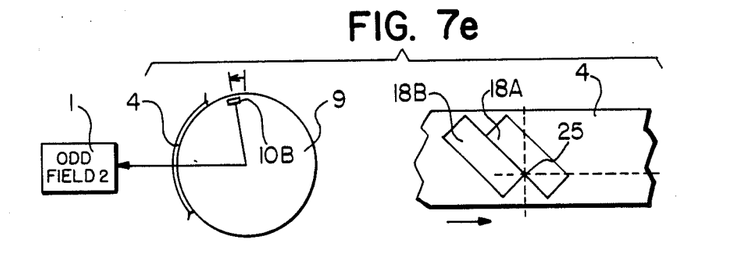
Figure 7F:
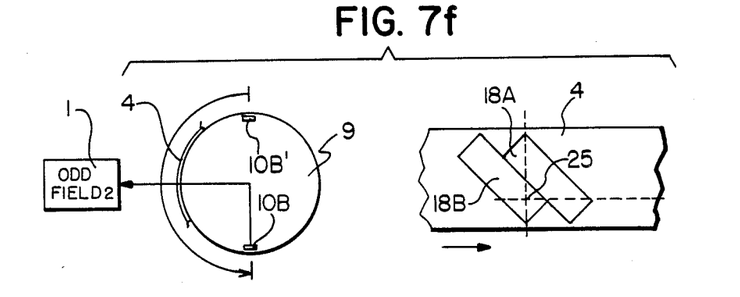
Figure 7G:
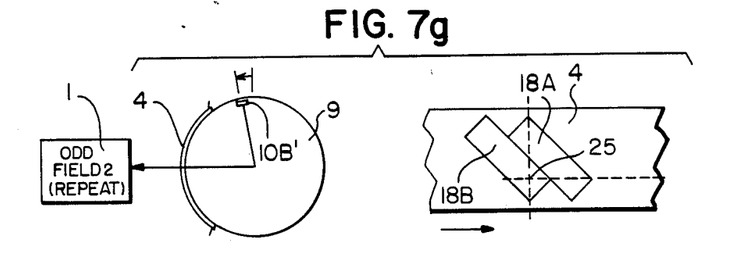
Figure 7H:
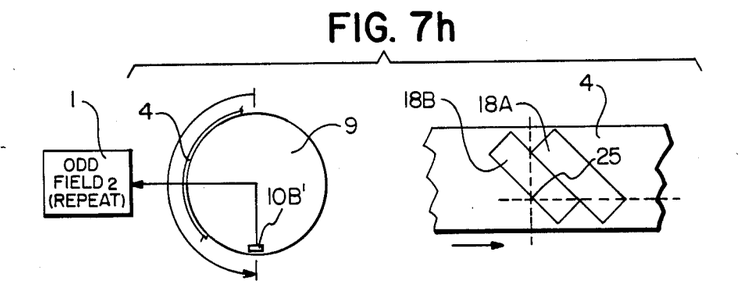

In FIG. 6c, the tape 4 has advanced somewhat with respect to the starting point 25 while the head 10A has completed tracing the track 18A. Referring to FIG. 6d, the drum 9 now rotates through another 180°, approximately. At this time, all head switches 12 of FIG. 1 are open so that even video field number 1 is skipped. The starting point 25 is now located near the left-hand border of the track 18A, so that recording of the next track 18B may now begin. The head switch 12B of FIG. 1 is now closed while all other head switches are open. As illustrated in FIG. 6e, recording of the second track 18B begins with rotation of the head 10B through the starting point 25. In FIG. 6f, the drum 9 has rotated by 180° with respect to the position illustrated in FIG. 6e, to complete the tracing of the second track 18B by the head 10B. As illustrated in FIG. 6g, the drum 9 rotates through another 180°, approximately, while all head switches are open so as to skip even video field number 2. The recording cycle now returns to the state illustrated in FIG. 6b, so that recording of the third track by the head 10A may now begin, and the foregoing cycle is repeated.

PLAYBACK

The playback operation is best understood by reference to the sequential diagrams of FIG. 7. In FIG. 7a, the longitudinal position of the tape 4 with respect to the starting point 25 and the rotational position of the drum 9 are the same as that illustrated in FIG. 6b. The head switch 12A (only) of FIG. 1 is closed as rotation of the drum 9 commences to facilitate playback of the track 18A by the head 10A. In FIG. 7b, the drum 9 has rotated 180° (half a revolution) to complete the playback of track 18A. The head 10A' now begins playback of the track 18A as illustrated in FIG. 7c, while the head switch 12A' (only) of FIG. 1 is closed. As illustrated in FIG. 7d, at the conclusion of the second half-rotation of the drum 9, the starting point 25 is located at the far edge of the track 18A while the head 10B is positioned over the track 18B. Now, the head switch 12B (only) of FIG. 1 is closed and the head 10B begins tracing the track 18B. As illustrated in FIG. 7f, as the head drum 9 rotates through another half-rotation, the head 10B scans the track 18B. Then, the head switch 12B' (only) of FIG. 1 is closed while the head 10B' begins retracing the track 18B (FIG. 7g). As illustrated in FIG. 7h, during the next half-rotation of the drum 9, the head 10B' completes tracing of the track 18B. At this point, the drum 9 returns to its original rotational position illustrated in FIG. 7a, and the cycle is repeated to playback subsequent tracks on the tape 4.

MULTIPURPOSE DRUM

The drum and head assembly of FIG. 1 performs skip-field video recording in the manner described above but is not ideally suited for normal ("non-skip-field") video recording. This is because normal zero guard-band video recording requires two heads having thin gaps oppositely canted and spaced apart by 180°, not $180° - (\theta_1 - \theta_2)$ as in FIG. 1.

Figure 8A:
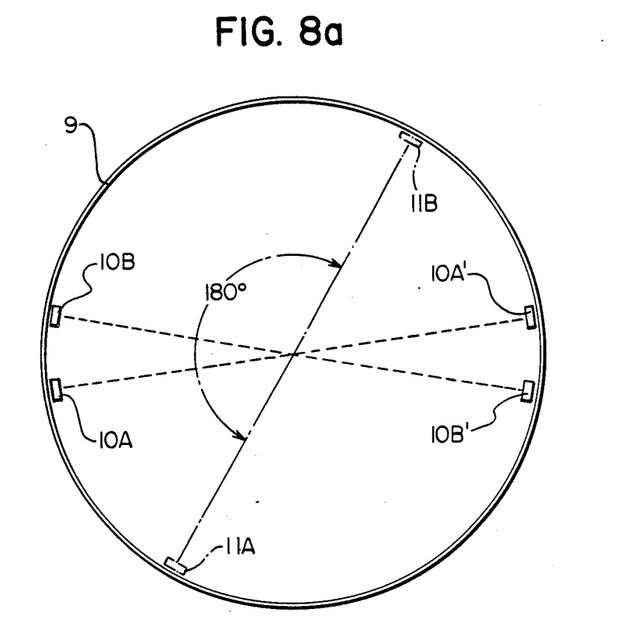

One way to render the drum of FIG. 1 useful for recording in both standard play mode and skip-field mode is to add an extra pair of heads 11A, 11B to the drum 9, as shown in dashed line in FIG. 8a. The heads 11A, 11B are spaced apart by 180° and have their gaps canted in different angles of azimuth, $+\alpha$, $-\alpha$. The heads 10A, B, A', B' are employed during skip-field recording and playback, while the heads 11A, 11B are employed during standard play (or long play) non-skip-field recording and playback. Thus, the drum 9 of FIG. 8a may be used for both types of operations.

Figure 8B:
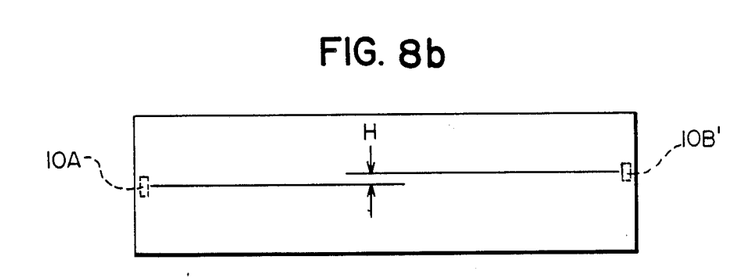
Figure 9A:
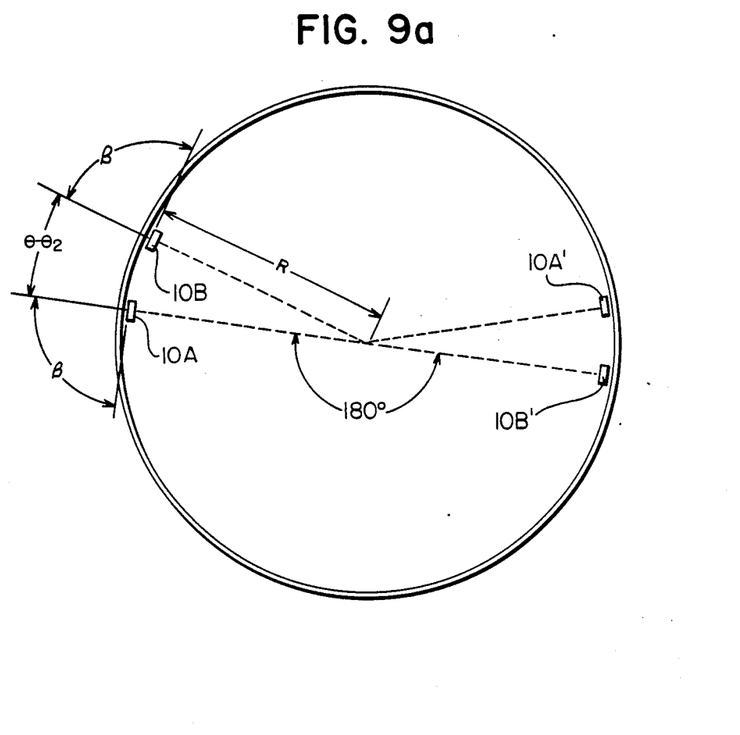
Figure 9B:
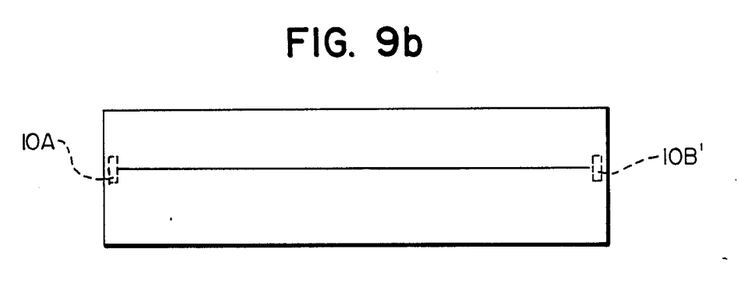

In order to avoid the necessity of adding the two heads 11A, 11B of FIG. 8a, the same result is obtained by moving the heads 10A, B, A', B' of FIGS. 8a and 8b to the configuration illustrated in FIGS. 9a and 9b. Specifically, in order to adapt the drum 9 to perform non-skip-field recording or playback, the heads 10A, 10B of FIG. 8a are moved along the drum periphery through the angle $\theta_1 - \theta_2$ (an arc distance of about 480 microns for the 8 mm format) to the position illustrated in FIG. 9a, and moved in an axial direction by the distance H (about five microns for the 8 mm format) from the axial position illustrated in FIG. 8b to that illustrated in FIG. 9b. Thus, the heads 10A and 10B' (only) of FIGS. 9a and 9b are positioned to perform standard (non-skip-field) playback of recording.

An actuator suitable for accomplishing the head movement between the positions of FIGS. 8a, 8b, and FIGS. 9a, 9b should meet five difficult requirements:

(1) The radial distance R (FIG. 9a) between the head contact surface and the drum axis must remain constant (e.g., to within a few microns for industry standard 8 mm tape recording format).

(2) The circumferential travel distance l (FIG. 9a) (subtended by the angle $\theta_1 - \theta_2$ along the drum periphery) must be established to within several microns (e.g., about $480 \pm 5$ microns for 8 mm tape recording).

(3) The tilt angle $\beta$ (FIG. 9a) which the head axis makes with the tangent to the drum periphery must be maintained to within a fraction of a degree (i.e., $90 \pm 0.01$ degrees).

(4) The axial height travel H (FIGS. 8b and 9b) must be established to within a fraction of H (e.g., about $5 \pm 1$ microns for 8 mm tape recording).

(5) The life-time wear of actuator surfaces must not exceed a fraction of the axial height travel tolerance (e.g., 0.5 micron for 8 mm tape recording).

While a mechanism meeting the requirements (1)–(4) above may have been theoretically feasible in the prior art, it would have seemed literally impossible to meet requirement (5) without incurring unacceptable hardware and manufacturing costs. This is because such a mechanism requires two surfaces in mutual contact to move relative to one another in order to move the heads 10A, 10B between the positions of FIGS. 8a and 9a. The contact wear of most materials will exceed 0.5 microns after a number of such movements. The number of head movements allowed before unacceptable wear occurs may be increased by spreading the contact surfaces over a large area, but this would increase the friction unacceptably and furthermore would be very susceptible to displacement by contamination. In order to reduce friction and reduce susceptibility to contamination, one contact surface may be reduced to three (or more) small points on a hard supporting surface, but this would accelerate wear to an unacceptable rate.

Figure 10A:
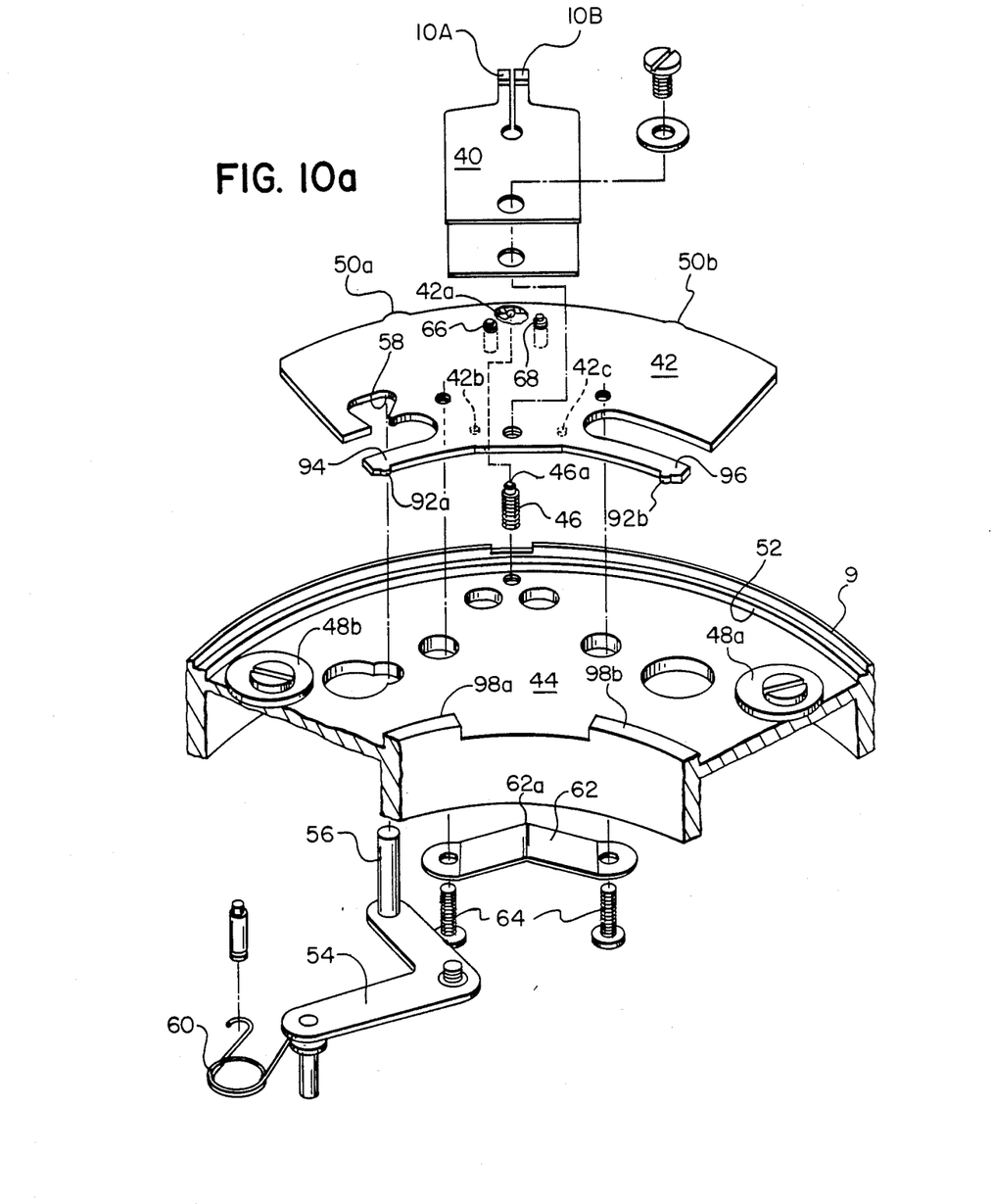
Figure 10B:
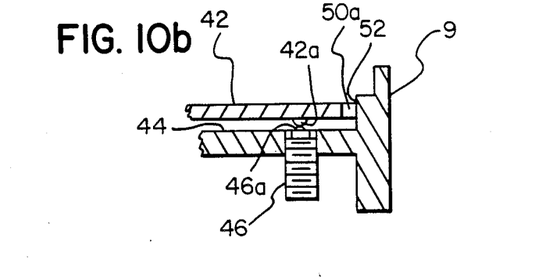

The present invention disposes of these difficulties while meeting all of the above requirements (1)–(5) in a head movement actuator illustrated in FIG. 10.

The heads 10A, 10B are mounted on a head support 40 which in turn is attached to a slide 42. The slide is characterized by three bosses 42a, 42b, 42c, resting on the top face 44 of the drum 9. A screw 46 having a ball 46a on its end is threaded through the drum 9 and makes contact with the boss 42a whenever the slide 42 is in the position corresponding to skip-field recording (FIGS. 8a, 8b). The ball raises the boss 42a by 5 microns above the top face 44. The slide 42 is movable along the periphery of the drum 9. The extent of this movement is established by the positions of two eccentric screws 48a, 48b. In the skip-field position (FIGS. 8a, 8b), the boss 42a rests directly over the screw 46, as mentioned previously. In the non-skip-field position (FIGS. 9a, 9b), the boss 42a rests directly on the drum top face 44. The radial position of the slide 42 is maintained by two bosses 50a, 50b extending radially and contacting the interior surface of a vertical wall 52 defining the periphery of the drum 9. A pair of bosses 92 integrally formed in a pair of spring portions 94, 96 of the slide 42 ride on a lip 98 integrally formed with the drum top face 44, the spring leaf portions 94, 96 bending slightly against the resulting force so as to maintain the radial position of the slide 42.

Movement of the slide 42 is effected by means of a lever 54 having a rod 56 extending through an opening 58 in the slide 42. In one embodiment, a spring 60 insures complete travel of the slide 42 between the two positions. The slide 42 is fastened to the drum 9 by a spring 62 having a small corner contact line surface 62a pressed against the bottom face of the drum 9 and a pair of screws 64 threaded through the spring 62 and through the drum 9 and fastened to the slide 42. Two screws, 66, 68, provide fine adjustment of the permanent position of the head support 40 and heads 10A, 10B with respect to the slide 42. In one embodiment, an additional plate (not shown) may be inserted between the slide 42 and drum face 44.

VIRTUALLY WEARLESS MATERIALS

It is a discovery of this invention that a large contact surface, such as the top face 44, should be a self-lubricating surface, while each small contact point such as the three bosses 42a, b, c or the ball 46a should be a very hard material. In the preferred embodiment, the bosses and ball comprise sapphire balls having a class 5 standard ball finish, while the surface of the top face 44 comprises Glahard-R material sold by Kao Soap Company, 1-14-10; Nihonbashi-Kayabacho; Chuoko, Tokyo 103, JAPAN. ("Glahard" is a trademark of the Kao Soap Company.) It is a further discovery of this invention that the pressure exerted by each point of contact on the Glahard surface (determined by the tension of the spring 62) should be sufficient to displace contaminants and even a portion (at least) of the self-lubricant of the Glahard material lying on the top face 44. Thus, the general principle of the invention is that a hard point of contact moves over a self-lubricating surface with a sufficient force and with a sufficiently small contact area to insure displacement of contaminants and at least a portion of the self-lubricant on the surface. Accordingly, any equivalent hard material and any equivalent self-lubricating material may be used for the bosses 42a, b, c and the top face 44, respectively.

ALTERNATIVE EMBODIMENT

Figure 11A:
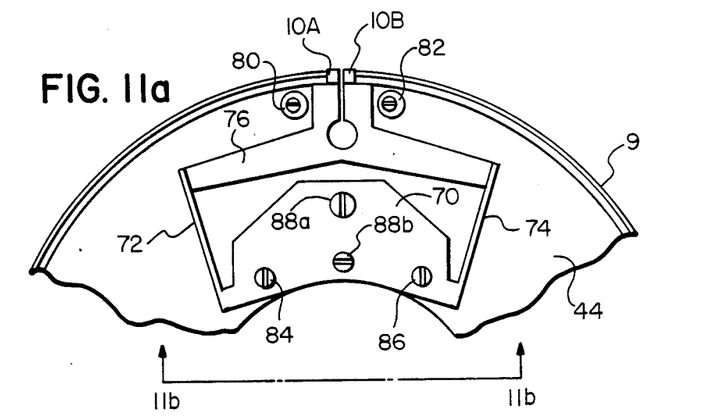
Figure 11B:
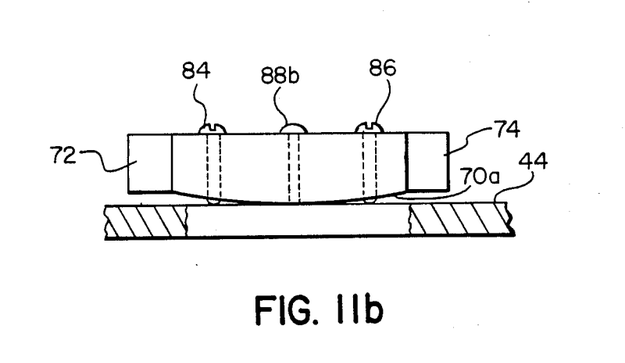

Referring to FIG. 11, friction may be virtually eliminated by using a flex assembly comprising a support bracket 70 mounted on the drum 9 and supporting a pair of flex sheet springs 72, 74, one end of each spring 72, 74 being mounted on the support member 70 and the other being attached to a head support member 76 on which the heads 10a, 10b are mounted. The flex assembly of FIG. 11 permits the heads 10A, 10B to travel between the normal mode and skip-field mode positions by merely forcing the flex springs 72, 74 to elastically bend as illustrated on FIG. 11. Length of arcuate travel of the heads 10A, 10B is determined by two eccentric screws 80, 82, fastened to the drum 9. Extent of travel of the heads 10A, 10B in the axial direction is regulated by the angular shape of the bottom surface 70a of the support member 70 and by the position of a pair of screws 84, 86 threaded through the support member 70 and contacting the top face 44 of the drum 9. Adjustment of the two screws 84, 86 causes the support member 70 to seesaw about an axis established by two screws 88a and 88b (the screw 88a attaching the support member 70 to the drum 9). Preferably, the support member 70 is tilted at an angle γ such that the axial height difference between the two positions established by the eccentric screws 80, 82 corresponds to the required height difference H illustrated in FIG. 1 (i.e., 5 microns for 8 mm recording).

The invention has been described in detail with particular reference to the preferred embodiments thereof, but it is understood that variations and modifications can be effected within the spirit and scope of the invention.

What is claimed is:

1. A video apparatus useful during non-simultaneous recording operations and playback operations, said apparatus including a rotary head drum having a drum rotation axis, which can record every other field of an interlaced video signal, including successive horizontal synchronization pulses, in adjacent parallel tracks of width W on a video during every other half-rotation of said drum, said apparatus comprising:

first and second magnetic heads disposed together on one side of said drum and being characterized by first and second head gap azimuth angles, respectively; and third and fourth magnetic heads disposed together on an opposite side of said drum and being characterized by said first and second head gap azimuth angles, respectively, wherein said first and second heads are offsettable from one another by an aligning drum rotation angle such that the successive horizontal synchronization pulses recorded by respective ones of said first and second heads in adjacent ones of said parallel tracks are in spatial alignment along the length of said tracks, wherein the tracks of every other pair of said tracks are linearly offset by a distance defined in that said aligning drum rotation angle corresponds to the drum rotation angle subtended over an arc distance equal to half said distance.

2. The video apparatus of claim 1 wherein:

said third and fourth heads are offsettable from said first and third heads along said drum rotation axis by a distance corresponding to said track width W so that said third and fourth heads retrace the same track traced by said first and second heads during each rotation of said drum; and said first and third heads are offsettable from one another by a drum rotation angle $180° \pm \theta_2$, wherein $\theta_2$ is an angle subtended by said rotary drum during a half horizontal line scan period of said video signal, whereby video signals reproduced by said third and fourth heads are displaced from those reproduced by said first and second heads by a half horizontal video line. respectively.

3. A video apparatus useful during non-simultaneous recording operations and playback operations, said apparatus including a rotary head drum having a drum rotation axis which can record every other field of an interlaced video signal including successive horizontal synchronization pulses in adjacent parallel tracks of width W on a video tape during every other half-rotation of said drum, said apparatus comprising:

first and second magnetic heads disposed together on one side of said drum and being characterized by first and second opposing head gap azimuth angles, respectively, wherein said first and second heads are offset from one another by an aligning drum rotation angle such that the successive horizontal synchronization pulses recorded by respective ones of said first and second heads in adjacent ones of said parallel tracks are in spatial alignment along the length of said tracks, wherein every other pair of said adjacent tracks are linearly offset from an adjacent pair by a distance defined in that said aligning drum rotation angle corresponds to the drum rotation angle subtended over an arc distance equal to half said distance.

4. The apparatus of any one of claims 1, 2 or 3, inclusive, further comprising:

means for moving at least one of said heads of a given head gap azimuth angle with respect to another one of said heads of a different head gap azimuth angle so that the two heads are displaced by 180° along the periphery of said drum and are located in the same plane parallel to the plane of said drum, whenever standard or long play recording or playback is to be performed, and for returning said one head to its original position whenever skip-field recording or playback is to be performed, said moving means comprising:

a top face on said drum;

a peripheral lip surrounding said top face along the periphery of said drum;

a slide having a bottom surface characterized by a plurality of contact points touching said drum top face and a plurality of contact points touching the interior surface of said lip;

means for supporting at least said one head;

a pair of eccentric adjustment means attached to said drum top face and disposed so as to restrict circumferential movement of said slide with respect to said drum periphery;

means on said drum top face and raised above said drum top face by a small distance, one of said plurality of contact points resting on said raised means whenever said slide is in a position corresponding to skip-field recording;

a plurality of adjustment screws fastened through said drum top face and abutting said slide.

5. The apparatus of any one of claims 1, 2, or 3, inclusive, further comprising:

means for moving at least one of said heads of a given head gap azimuth angle with respect to another one of said heads of a different head gap azimuth angle so that the two heads are displaced by 180° along the periphery of said drum and are located in the same plane parallel to the plane of said drum, whenever standard or long play recording or playback is to be performed, and for returning said one head to its original position whenever skip-field recording or playback is to be performed, said moving means comprising:

a top face on said drum;

a peripheral lip surrounding said top face along the periphery of said drum;

a slide having a bottom surface characterized by a plurality of contact points touching said drum top face and a plurality of contact points touching the interior surface of said lip;

means for supporting at least said one head;

a pair of eccentric adjustment means attached to said drum top face and disposed so as to restrict circumferential movement of said slide with respect to said drum periphery;

means on said drum top face and raised above said drum top face by a small distance, one of said plurality of contact points resting on said raised means whenever said slide is in a position corresponding to skip-field recording;

a plurality of adjustment screws fastened through said drum top face and abutting said slide, wherein said top face comprises a self-lubricating material, and wherein said plurality of bosses comprises a hard material, said apparatus further including means for compressing said slide toward said drum top face whereby said hard material of said bosses displaces contamination and at least a portion of self-lubricant from said top face whenever said slide moves with respect thereto.

6. The apparatus of any one of claims 1, 2 or 3, inclusive, further comprising:

means for moving at least one of said heads of a given head gap azimuth angle with respect to another one of said heads of a different head gap azimuth angle so that the two heads are displaced by 180° along the periphery of said drum and are located in the same plane parallel to the plane of said drum, whenever standard or long play recording or playback is to be performed, and for returning said one head to its original position whenever skip-field recording or playback is to be performed, said moving means comprising:

a top face on said drum;

a peripheral lip surrounding said top face along the periphery of said drum;

a slide having a bottom surface characterized by a plurality of contact points touching said drum top face and a plurality of contact points touching the interior surface of said lip;

means for supporting at least said one head;

a pair of eccentric adjustment means attached to said drum top face and disposed so as to restrict circumferential movement of said slide with respect ot said drum periphery;

means on said drum top face and raised above said drum top face by a small distance, one of said plurality of bosses resting on said raised means whenever said slide is in a position corresponding to skip-field recording;

a plurality of adjustment screws fastened through said drum top face and abutting said slide, wherein said top face comprises a self-lubricating material, and wherein said plurality of bosses comprises a hard material, said apparatus further including means for compressing said slide toward said drum top face whereby said hard material of said bosses displaces contamination and at least a portion of self-lubricant from said top face whenever said slide moves with respect thereto, wherein said self-lubricating material comprises Glahard-R material and said hard material comprises Class V sapphire balls.

7. The apparatus of any one of claims 1, 2 or 3, inclusive, further comprising:

means for moving at least one of said heads of a given head gap azimuth angle with respect to another one of said heads of a different head gap azimuth angle so that the two heads are displaced by 180° along the periphery of said drum and are located in the same plane parallel to the plane of said drum, whenever standard or long play recording or playback is to be performed, and for returning said one head to its original position whenever skip-field recording or playback is to be performed, wherein said means for moving comprise:

a pair of planar flex levers;

means attaching each of said flex levers at one of its ends to a portion of said drum;

means supporting at least one of said heads on the other end of each of said flex levers, whereby said one head moves in the plane of said drum along the periphery of said drum at a nearly constant radius with respect to said drum axis whenever said flex lever is elastically moved about an axis defined by said drum attaching means; and means for supporting said lever-drum attachment means on said drum at a slight tilt angle with respect thereto so that the axis of rotation of said flex levers and the movement of said one head is tilted slightly with respect to the plane of said drum, whereby said one head travels a distance along the axis of said drum equal to the width of one of said tracks projected on said drum axis whenever said flex levers are moved; and eccentric adjustment means attached to said drum defining the extreme positions of said flex lever travel and the position of said one head, corresponding, respectively, to a skip-field recording position and a standard play recording position.

* * * * *